United States Patent
Chu et al.

(10) Patent No.: US 11,079,839 B2
(45) Date of Patent: Aug. 3, 2021

(54) EYE TRACKING DEVICE AND EYE TRACKING METHOD APPLIED TO VIDEO GLASSES AND VIDEO GLASSES

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Minglei Chu, Beijing (CN); Hao Zhang, Beijing (CN); Lili Chen, Beijing (CN); Bin Zhao, Beijing (CN); Ruijun Dong, Beijing (CN); Chenru Wang, Beijing (CN); Yali Liu, Beijing (CN); Xuebing Zhang, Beijing (CN); Jiankang Sun, Beijing (CN); Guixin Yan, Beijing (CN); Ziqiang Guo, Beijing (CN); Xinjian Liu, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 300 days.

(21) Appl. No.: 16/233,947

(22) Filed: Dec. 27, 2018

(65) Prior Publication Data
US 2019/0204911 A1     Jul. 4, 2019

(30) Foreign Application Priority Data
Jan. 2, 2018   (CN) .......................... 201810004096.7

(51) Int. Cl.
*G06F 3/01*     (2006.01)
*G06T 7/80*     (2017.01)
(Continued)

(52) U.S. Cl.
CPC ................ *G06F 3/013* (2013.01); *G06T 7/70* (2017.01); *G06T 7/80* (2017.01); *H04N 5/2256* (2013.01);
(Continued)

(58) Field of Classification Search
CPC ... G06F 3/013; G06T 7/80; G06T 7/70; G06T 2207/30201; G06T 2207/10048
See application file for complete search history.

(56) References Cited

U.S. PATENT DOCUMENTS 10,438,986 B1 * 10/2019 Bikumandla ..... H01L 27/14625
2012/0127062 A1    5/2012 Bar-Zeev et al.
(Continued)

FOREIGN PATENT DOCUMENTS

| CN | 102445756 A | 5/2012 |
|---|---|---|
| CN | 205594581 U | 9/2016 |

(Continued)

OTHER PUBLICATIONS

First Office Action for Chinese Application No. 201810004096.7, dated Apr. 25, 2019, 9 Pages.

*Primary Examiner* — Oschta I Montoya
(74) *Attorney, Agent, or Firm* — Brooks Kushman P.C.

(57) ABSTRACT

An eye tracking device and an eye tracking method applied to video glasses, and video glasses are provided. The eye tracking device includes a light source component, a reflection component, an image sensor component and a main control component. The light source component is configured to emit invisible light to an eyeball, the reflection component is configured to reflect the invisible light reflected by the eyeball, the image sensor component is configured to generate an image of the eyeball based on the invisible light reflected by the reflection component, and the main control component is coupled to the image sensor (Continued)

component and is configured to acquire a gaze direction based on the image of the eyeball.

17 Claims, 4 Drawing Sheets (51) Int. Cl.
*H04N 5/225* (2006.01)
*G06T 7/70* (2017.01)
(52) U.S. Cl.
CPC .............. *G06T 2207/10048* (2013.01); *G06T 2207/30201* (2013.01)

(56) References Cited

U.S. PATENT DOCUMENTS

| | | | | |
|---|---|---|---|---|
| 2012/0206452 | A1* | 8/2012 | Geisner | H04S 7/304 |
| | | | | 345/419 |
| 2018/0277033 | A1 | 9/2018 | Jia et al. | |
| 2019/0113968 | A1* | 4/2019 | Huang | G06K 9/00335 |
| 2019/0213402 | A1* | 7/2019 | Yang | G06K 9/00845 |

FOREIGN PATENT DOCUMENTS

| | | |
|---|---|---|
| CN | 205657058 U | 10/2016 |
| CN | 106168853 A | 11/2016 |
| CN | 106598260 A | 4/2017 |
| CN | 206505382 U | 9/2017 |

* cited by examiner

EYE TRACKING DEVICE AND EYE TRACKING METHOD APPLIED TO VIDEO GLASSES AND VIDEO GLASSES

CROSS-REFERENCE TO RELATED APPLICATION

This application claims priority to Chinese Patent Application No. 201810004096.7 filed on Jan. 2, 2018, which is incorporated herein by reference in its entirety.

TECHNICAL FIELD

The present disclosure relates to the field of human-computer interaction technology, and in particular to an eye tracking device and an eye tracking method applied to video glasses, and video glasses.

BACKGROUND

Eye tracking technique acquires a current gaze direction of a testee using various kinds of testing approaches such as mechanical testing approaches, electronic testing approaches and optical testing approaches. With the rapid development of computer vision, artificial intelligence technologies and digital technologies, the eye tracking technique has become a current research hotspot and is widely used in the field of human-computer interaction such as virtual reality, augmented reality, driving assistance, user experience and cognitive disorder diagnosis.

Eye tracking devices in related technologies have the disadvantages of complicated structures and large sizes.

SUMMARY

In an aspect, the present disclosure provides in some embodiments an eye tracking device applied to a pair of video glasses. The eye tracking device includes a light source component, a reflection component, an image sensor component and a main control component. The light source component is configured to emit invisible light to an eyeball, the reflection component is configured to reflect the invisible light reflected by the eyeball, the image sensor component is configured to generate an image of the eyeball based on the invisible light reflected by the reflection component, and the main control component is coupled to the image sensor component and is configured to acquire a gaze direction based on the image of the eyeball.

In some embodiments of the present disclosure, the light source component includes one or more light sources for emitting invisible light.

In some embodiments of the present disclosure, the one or more light sources include an infrared light source or an ultraviolet light source.

In some embodiments of the present disclosure, the video glasses include a lens, and the reflection component is arranged at a side of the lens close to the image sensor component.

In some embodiments of the present disclosure, the reflection component includes an invisible light reflective film, and the invisible light reflective film is coated on a surface of the lens at the side close to the image sensor component.

In some embodiments of the present disclosure, the light source component includes multiple light sources for emitting invisible light, and the multiple light sources are uniformly distributed along a circumferential direction of the lens.

In some embodiments of the present disclosure, the light source component is configured to emit light having a predetermined wavelength, the reflection component is configured to reflect the light having the predetermined wavelength, and the image sensor component is configured to generate the image of the eyeball based on the light having the predetermined wavelength.

In some embodiments of the present disclosure, the predetermined wavelength is 850 nm.

In some embodiments of the present disclosure, the eye tracking device further includes a calibration light source component. The calibration light source component is configured to emit invisible light to the reflection component.

In some embodiments of the present disclosure, the reflection component is configured to reflect the invisible light emitted by the calibration light source, the image sensor component is configured to generate a calibration light source image, and the main control component is configured to acquire a calibration matrix corresponding to the image sensor component based on the calibration light source image.

In some embodiments of the present disclosure, the calibration light source component includes calibration light sources arranged in an array.

In some embodiments of the present disclosure, the main control component is configured to acquire the gaze direction based on the image of the eyeball and the calibration matrix.

In some embodiments of the present disclosure, the light source component is connected to the main control component via a first interface, the first interface being a one-way interface through which a control signal is transmitted from the main control component to the light source component, and/or the first interface being an interface having a power supplying function. The image sensor component is connected to the main control component via a second interface, the second interface being a two-way interface through which at least one of a control signal or a digital signal is transmitted between the main control component and the image sensor component, and/or the second interface being an interface having a power supplying function. The calibration light source component is connected to the main control component via a third interface, the third interface being a one-way interface through which a control signal is transmitted from the main control component to the calibration light source component, and/or the third interface being an interface having a power supplying function.

In some embodiments of the present disclosure, the main control component is configured to determine a position of a gaze point of the eyeball corresponding to the gaze direction according to a predetermined correspondence between gaze directions and positions of gaze points of the eyeball.

In another aspect, the present disclosure provides in some embodiments a pair of video glasses, including the above described eye tracking device.

In another aspect, the present disclosure provides in some embodiments an eye tracking method which is applied to a pair of video glasses and implemented with the above described eye tracking device. The eye tracking method includes: receiving an image of an eyeball; and acquiring a gaze direction based on the image of the eyeball.

In some embodiments of the present disclosure, before receiving the image of the eyeball, the eye tracking method further includes: receiving a calibration light source image; and acquiring a calibration matrix based on the calibration light source image.

In some embodiments of the present disclosure, acquiring the gaze direction based on the image of the eyeball includes: acquiring the gaze direction based on the image of the eyeball and the calibration matrix.

BRIEF DESCRIPTION OF THE DRAWINGS

Drawings are to facilitate further understanding of technical solution of embodiments of the present disclosure and act as a part of the specification. The drawings in combination with the embodiments are used to explain rather than to limit the technical solutions in the embodiments of the present disclosure.

DETAILED DESCRIPTION

To better clarify objectives, technical solutions and advantages of the present disclosure, embodiments of the present disclosure are detailed hereinafter in conjunction with drawings. It should be noted that, the embodiments of the disclosure can be combined or features in the embodiments can be combined in any way as long as no conflict is caused.

Unless otherwise defined, technical terms or scientific terms used in the present disclosure shall have common meanings understood by the ordinary skilled in the art. Terms such as "first" and "second" in the present disclosure do not indicate any order, quantity or importance, and they are merely used to distinguish different components. Terms such as "include" or "contain" indicate that an element or object before such terms covers an element, an object or the equivalent enumerated after such terms, and do not exclude other elements and objects. Terms such as "coupled" and "connected" are not used to limit physical or mechanical connection, and they may be direct or indirect electrical connection. Terms such as "above", "below", "left" and "right" are merely to describe relative position relationships, and if an absolute position of a described object changes, relative positions with respect to the described object may change correspondingly.

Embodiments of the present disclosure are described in detail based on an example of human-computer interaction scenario. In addition to the human-computer interaction scenario, the embodiments of the present disclosure may be applied to other scenarios such as virtual reality, augmented reality, driving assistance, user experience and cognitive disorder diagnosis. Furthermore, although embodiments are given hereinafter based on human user, the present disclosure is not limited thereto. In fact, technical solutions according to the embodiments of the present disclosure may be applied to animals or nonliving objects having an eye analogue.

In view of complex structure and large size of an eye tracking device in related technology, the present disclosure provides in some embodiments an eye tracking device and an eye tracking method applied to video glasses, and video glasses.

Embodiments of the present disclosure provide an eye tracking device and an eye tracking method applied to a pair of video glasses, and a pair of video glasses, which may be arranged in a virtual reality glasses device or an augmented reality glasses device. Eye tracking is achieved by a special design of an inner structure of the video glasses, such that a user wearing a glasses device may operate and control a display terminal based on eye tracking technique when viewing the display terminal in front of the glasses, and may further achieve functions such as human-computer interaction and foveated rendering.

Figure 1:
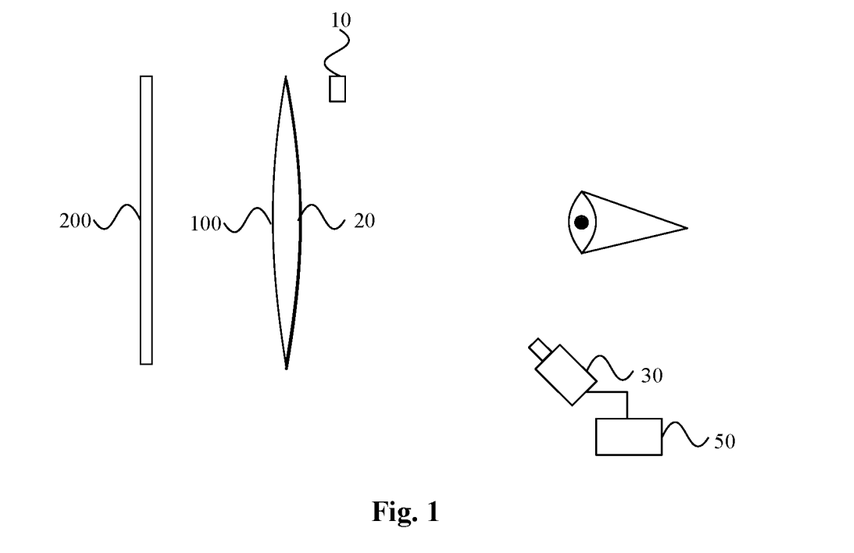
FIG. 1 is a schematic structural diagram of an eye tracking device applied to video glasses according to some embodiments of the present disclosure.

FIG. 1 is a schematic structural diagram of an eye tracking device applied to video glasses according to some embodiments of the present disclosure. As shown in FIG. 1, the eye tracking device includes: a light source component 10, a reflection component 20, an image sensor component 30 and a main control component 50.

In the embodiments, the light source component 10 is configured to emit invisible light to an eyeball of a user; the reflection component 20 is configured to reflect the invisible light reflected by the eyeball; the image sensor component 30 is configured to generate an image of the eyeball based on the invisible light reflected by the reflection component, and the main control component 50 is coupled to the image sensor component and is configured to acquire a gaze direction based on the image of the eyeball.

For example, a relative position of a center of a pupil with respect to a center of an eye orbit may be acquired based on the image of the eyeball so as to obtain the gaze direction. For another example, a relative position of a reflection point on a cornea with respect to a center of the pupil may be acquired based on the image of the eyeball so as to obtain the gaze direction.

The pair of video glasses may include a pair of virtual reality glasses device or a pair of augmented reality glasses device.

FIG. 1 further illustrates a lens 100 and a display terminal 200 viewed by the user. The lens 100 is fixed on an optical propagation path between the eyeball and the display terminal 200. A periphery of the lens is at a periphery of a viewing angle of the video glasses or outside the viewing angle of the video glasses. The lens 100 is configured to assist in focal length adjusting.

The lens 100 may be of various types. For example, the lens may be a planoconvex lens, a symmetric or asymmetric biconvex lens, or a convexoconcave lens, which is not limited herein.

In some embodiments of the present disclosure, the display terminal 200 may allow the user to view visual data provided by a head-mounted virtual reality device or a head-mounted augmented reality device or other visual data, such as a game image. Exemplarily, the display terminal may include an LCD screen, an LED screen, an OLED screen, a projector, or other display technologies such as a mobile phone screen or a tablet computer screen.

In the embodiments, a position of the light source component 10 is not specifically defined as long as the light source component 10 may emit invisible light to the eyeball. In some embodiments of the present disclosure, the light source component 10 is arranged at a side of the lens 100 away from the display terminal 200. The light source component 10 may be arranged at the periphery of the viewing angle of the video glasses or outside the viewing angle of the video glasses, avoiding blocking view of the user.

In some embodiments of the present disclosure, the light source component 10 includes one or more light sources 11 for emitting invisible light. It should be noted that, eye tracking accuracy increases as the quantity of the light source(s) 11 increases, while a size of the eye tracking device increases as the quantity of the light source(s) 11 increases.

Figure 2:
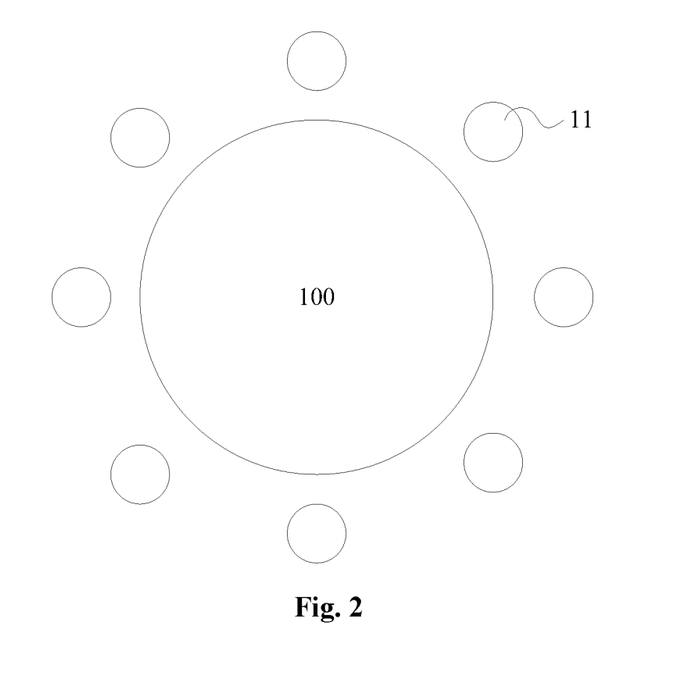
FIG. 2 a schematic structural diagram of a light source component according to some embodiments of the present disclosure.

FIG. 2 is a schematic structural diagram of a light source component according to some embodiments of the present disclosure. As shown in FIG. 2, the light source component includes eight light sources 11 that are uniformly distributed. For example, the eight light sources 11 are uniformly distributed along a circumferential direction of the lens 100.

In some embodiments of the present disclosure, the light source 11 may include an infrared light source or an ultraviolet light source. Specifically, the light source 11 may include an infrared light-emitting diode (LED) light source or an ultraviolet LED light source.

The light source 11 may be annular, triangular, square, rectangular, oval, hyperbolic or of any other regular or irregular shape. FIG. 2 exemplarily shows a circular light source while it is not limited thereto in embodiments of the present disclosure.

It should be noted that since the eyeball reflects the invisible light, a reflection point may be formed on the eyeball. Specifically, human eyes may sense light having a wavelength ranging approximately from 300 nanometers to 780 nanometers, and the light source 11 may adopt the infrared light source in order not to affect human in viewing the display terminal normally since human eyes have low sensitivity to infrared light and the infrared light is less harmful to human eyes. In addition, by arranging the light source component at the periphery of the viewing angle of the video glasses or outside the viewing angle of the video glasses, installment of the light source component is easy and normal view of the display terminal by people will not be affected.

In the embodiments, a position where the reflection component 20 is arranged is not specifically limited as long as the reflection component 20 can reflect the invisible light reflected by the eyeball of the user using the video glasses. To achieve both simple structure and small size of the eye tracking device, in some embodiments of the present disclosure, the reflection component may be arranged at a side of the lens away from the display terminal. For example, the reflection component is arranged on a surface of the lens away from the display terminal.

In some embodiments of the present disclosure, the reflection component 20 includes an invisible light reflective plate which is configured to reflect invisible light. The invisible light reflective plate may be a flat plate.

In some embodiments of the present disclosure, the reflection component 20 includes an invisible light reflective film. The invisible light reflective film may be coated on a surface of the lens at a side of the lens close to the image sensor component. Specifically, in embodiment shown in FIG. 1, the reflection component is the invisible light reflective film. By coating the reflection component on the lens according to the embodiments of the present disclosure, the structure of the eye tracking device is simplified and the size of the eye tracking device is reduced.

In the embodiments, a position of the image sensor component 30 is not specifically limited as long as the image sensor component 30 can generate an image of the eyeball based on the invisible light reflected by the reflection component. In some embodiments of the present disclosure, the image sensor component is arranged at a side of the reflection component away from the lens. It should be noted that the image sensor component may be located at the periphery of the viewing angle of the video glasses or outside the viewing angle of the video glasses, such that installment of the image sensor component is simple and normal view of the display terminal by people may not be affected.

In some embodiments of the present disclosure, the image sensor component may be an invisible light camera.

In some embodiments of the present disclosure, the light source component is configured to emit light having a predetermined wavelength, the reflection component is configured to reflect the light having the predetermined wavelength, and the image sensor component is configured to generate an image of the eyeball based on the light having the predetermined wavelength.

In some embodiments of the present disclosure, the predetermined wavelength is 850 nm.

In some embodiments of the present disclosure, in a case that the light source component 10 emits infrared light, the reflection component 20 may only reflect infrared light and the image sensor component 30 may only receive infrared light and generate the image of the eyeball based on the infrared light.

In some embodiments of the present disclosure, the main control component 50 is coupled to the light source component 10 and the image sensor component 30 respectively and is configured to acquire a gaze direction based on the image of the eyeball.

The main control component according to the embodiments may include an element for executing a computation task, such as a printed circuit board or other electronic element. The main control component may be connected, in a wired way or a wireless way, to an external intelligent device such as a cellular phone, a computer or a tablet computer and may process image data using a processor of the cellular phone, the computer or the tablet computer.

Specifically, the main control component is configured to control an on or off state of the light source component. The main control component is further configured to receive the image of the eyeball acquired by the image sensor component, process (e.g., performs an algorithm processing) image data of the image of the eyeball to acquire a gaze point of the eye. Or, the main control component is configured to receive the image of the eyeball acquired by the image sensor component, transmit the image to an intelligent device, and receive a gaze point of the eye returned by the intelligent device, where the intelligent device processes image data of the image of the eyeball to acquire the gaze point of the eye. The main control component may perform an operation on the display terminal based on the gaze point of the eye, thereby achieving functions such as human-computer interaction and foveated rendering.

For example, images of the eyeball gazing at multiple locations (such as boundary locations) at the display terminal 200 may be acquired in advance through simulations or experiments, to obtain a correspondence between gaze directions and gaze points of the eye. In this way, a current gaze point of the eye may be acquired based on the correspondence and a gaze direction corresponding to a current image of the eyeball.

Figure 3:
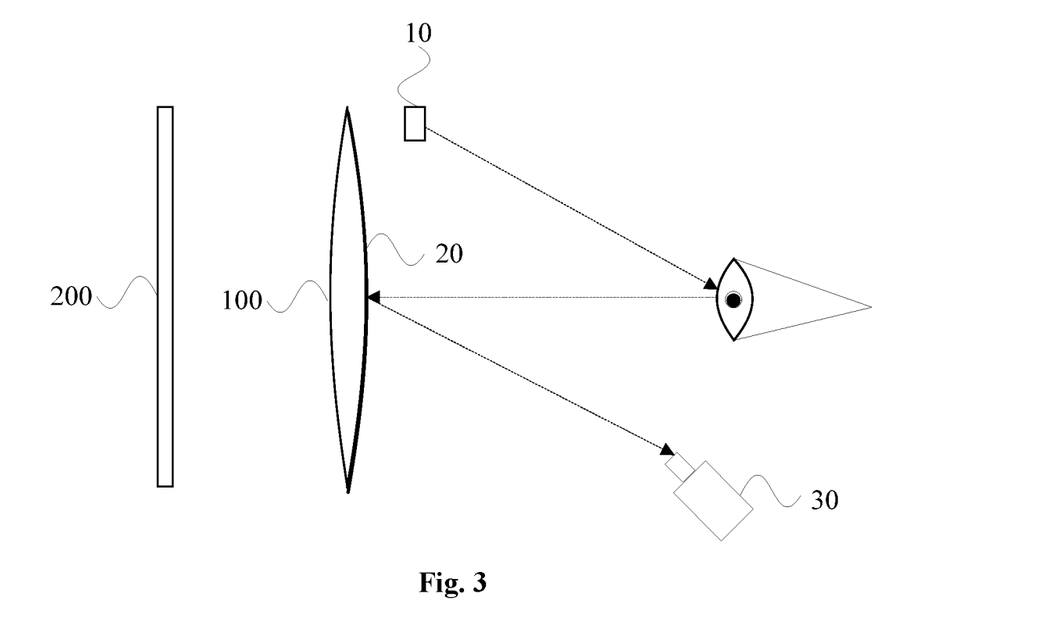
FIG. 3 illustrates an imaging optical path of an eye tracking device applied to video glasses according to some embodiments of the present disclosure.

FIG. 3 illustrates an imaging optical path of an eye tracking device applied to video glasses according to some embodiments of the present disclosure. The imaging optical path of the eye tracking device is described as follows: (1) the light source component 10 emits invisible light to the eyeball, the eyeball reflects the invisible light and a reflection point is formed on eyeball; (2) the reflection point formed on the eyeball is reflected by the reflection component and is imaged to the image sensor component.

The eye tracking device applied to the video glasses according to the embodiments of the present disclosure includes the light source component, the reflection component, the image sensor component and the main control component. The light source component is configured to emit the invisible light to the eyeball of the user. The reflection component is configured to reflect the invisible light reflected by the eyeball of the user. The image sensor component is configured to generate the image of the eyeball based on the invisible light reflected by the reflection component. The main control component is coupled to the image sensor component and is configured to acquire the gaze direction based on the image of the eyeball. In the embodiments of the present disclosure, eye tracking is achieved based on the image of the eyeball generated using the invisible light reflected by the eyeball. Furthermore, since eye tracking is realized via the light source component, the reflection component, the image sensor component and the main control component, the eye tracking device of the video glasses has a simple structure and a reduced size.

It is not required to realize all the above described advantages when implementing any product or method according to the present disclosure. Other features and advantages are to be described hereinafter, partial of which are apparent from embodiments in the specification or understandable by implementing the present disclosure. Objectives and other advantages of the embodiments of the present disclosure may be achieved and acquired through structures specifically defined in the specification, the list of claims and the drawings.

Figure 4:
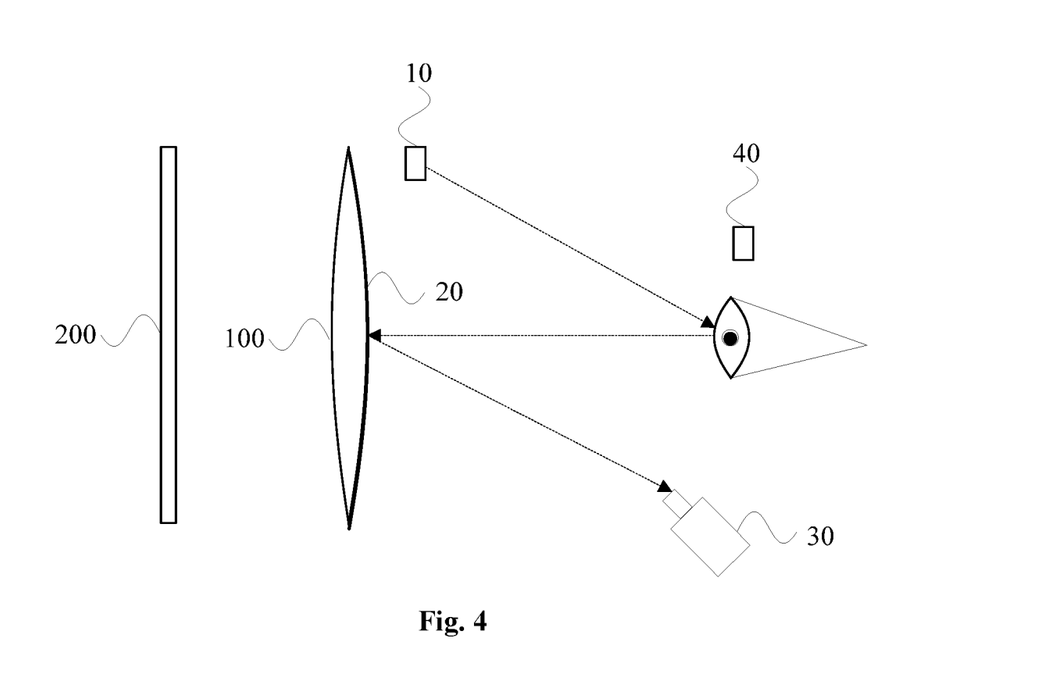
FIG. 4 is a schematic structural diagram of an eye tracking device applied to video glasses according to some embodiments of the present disclosure.

In some embodiments of the present disclosure, in a case that the reflection component 20 is an invisible light reflective film coated on the lens 100, the image of the eyeball generated by the image sensor component may be calibrated. FIG. 4 is another schematic structural diagram of an eye tracking device applied to video glasses according to some embodiments of the present disclosure. As shown in FIG. 4, the eye tracking device according to the embodiments of the present disclosure may further include a calibration light source component 40.

In the embodiments, the calibration light source component 40 is fixed at a side of the reflection component 20 away from the lens 100 and is configured to emit invisible light to the reflection component 20.

In some embodiments of the present disclosure, the reflection component 20 is further configured to reflect the invisible light emitted by the calibration light source component 40. The image sensor component 30 is further configured to generate a calibration light source image based on the invisible light that is emitted by the calibration light source component 40 and then reflected by the reflection component 20. The main control component is coupled to the calibration light source component 40 and is further configured to acquire a calibration matrix corresponding to the image sensor component based on the calibration light source image.

In some embodiments of the present disclosure, the calibration light source component 40 includes calibration light sources 41 distributed in an array. Light emitted by the calibration light sources 41 in the calibration light source component 40 has an identical wavelength to light emitted by the light source 11 in the light source component 10.

In some embodiments of the present disclosure, the calibration light source 41 includes an infrared light source or an ultraviolet light source. Specifically, the calibration light source 41 may include an infrared light-emitting diode (LED) light source or an ultraviolet LED light source. In some embodiments of the present disclosure, the calibration light source 41 includes the infrared light source, so as to protect human eye.

Figure 5:
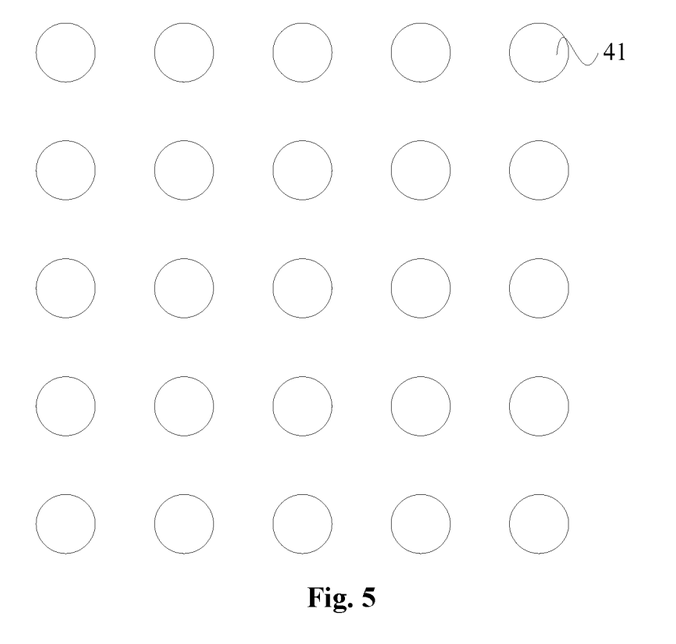
FIG. 5 is a schematic structural diagram of a calibration light source component according to some embodiments of the present disclosure.

The calibration light source 41 may be annular, triangular, square, rectangular, oval, hyperbolic or of any other regular or irregular shape. FIG. 5, which is a schematic structural diagram of the calibration light source component according to embodiments of the present disclosure, exemplarily shows a circular calibration light source while it is not limited thereto in the embodiments of the present disclosure.

In some embodiments of the present disclosure, the calibration light sources distributed in array include M*N calibration light sources, where M may be either equal to or different from N, which is not limited herein. It should be noted FIG. 5 exemplarily illustrates 5×5 calibration light sources, and distances between adjacent calibration light sources are identical, i.e., the calibration light sources are spaced from each other with an identical interval; however, the present disclosure is not limited thereto.

Specifically, the main control component performs image processing based on an adequate amount of images of the calibration light sources to acquire a position of each calibration light source in the image, and performs camera setting using a camera calibration method (such as Zhengyou Zhang calibration method) to acquire a calibration matrix for an image generated by the image sensor component.

In some embodiments of the present disclosure, the main control component is specifically configured to acquire the gaze direction based on the image of the eyeball and the calibration matrix.

Specifically, the main control component may be configured to acquire calibrated image of the eyeball according to a product of the image of the eyeball and the calibration matrix so as to obtain the gaze direction based on the calibrated image of the eyeball.

In some embodiments of the present disclosure, the light source component is connected to the main control component via a first interface. The first interface is a one-way interface through which a control signal is transmitted from the main control component to the light source component, and/or the first interface is an interface having a power supplying function.

In some embodiments of the present disclosure, the image sensor component is connected to the main control component via a second interface. The second interface is a two-way interface through which at least one of a control signal or a digital signal is transmitted between the main control component and the image sensor component; and/or the second interface is an interface having a power supplying function.

In some embodiments of the present disclosure, the calibration light source component is connected to the main control component via a third interface. The third interface is a one-way interface through which a control signal is transmitted from the main control component to the calibration light source component; and/or the third interface is an interface having a power supplying function.

An operating principle of the eye tracking device applied to the video glasses provided in the embodiments of the present disclosure is further detailed as follows.

At the initial of a first time or any time the user uses the eye tracking device, the calibration light source component is controlled to be turned on (e.g., the main control component coupled to the calibration light source component may control the calibration light source component to be turned on), and the calibration light source emits invisible light. The reflection component reflects the invisible light emitted by the calibration light source component. The main control component controls the image sensor component to generate a calibration light source image, receives the calibration light source image of the calibration light source component, and generates a calibration matrix based on the calibration light source image.

During the user uses the eye tracking device, the calibration light source component is controlled to be turned off (e.g., the main control component coupled to the calibration light source component may control the calibration light source to be turned off), and the light source component is controlled to be turned on (e.g., the main control component coupled to the light source component may control the light source to be turned on). The light source component emits invisible light to the eyeball. The reflection component reflects the invisible light reflected by the eyeball. The main control component controls the image sensor component to generate an image of the eyeball based on the invisible light reflected by the reflection component. The main control component receives the image of the eyeball and acquires a gaze direction based on the image of the eyeball and the calibration matrix.

When the user finishes using the eye tracking device, the light source component is controlled to be turned off. (e.g., the main control component coupled to the light source component may control the light source to be turned off).

Figure 6:
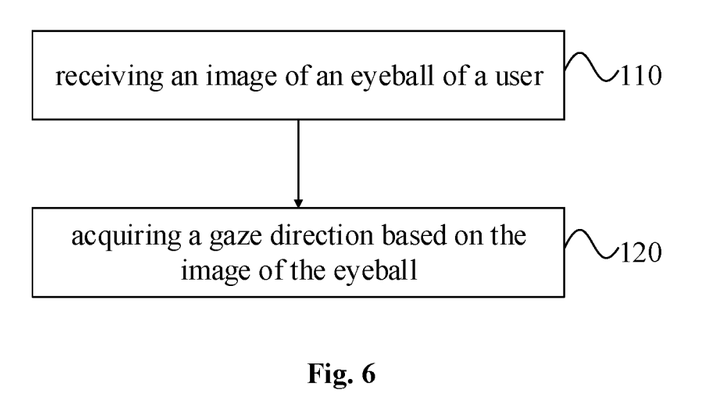
FIG. 6 is a flow chart of an eye tracking method applied to video glasses according to some embodiments of the present disclosure.

FIG. 6 is a flow chart of an eye tracking method applied to a pair of video glasses according to some embodiments of the present disclosure. The eye tracking method is implemented by the eye tracking device applied to the video glasses according to foregoing embodiments. The eye tracking device includes: a light source component, a reflection component, an image sensor component and a main control component. As shown in FIG. 6, the eye tracking method applied to the video glasses according to the embodiments of the present disclosure includes steps 110 to 120.

In step 110, an image of an eyeball of a user is received.

In step 120, a gaze direction is obtained based on the image of the eyeball.

The eye tracking method applied to the video glasses according to the embodiments of the present disclosure is achieved by using the above described eye tracking device applied to the video glasses. The eye tracking method includes: receiving the image of the eyeball of the user, and acquiring the gaze direction based on the image of the eyeball. In the embodiments of the present disclosure, the eye tracking method is implemented using an eye tracking device and the eye tracking device has a simple structure and a reduced size.

The eye tracking device herein is the eye tracking device according to the foregoing embodiments, which have similar implementing principles and achieved effects. The implementing principles and achieved effects are not repeated herein.

Figure 7:
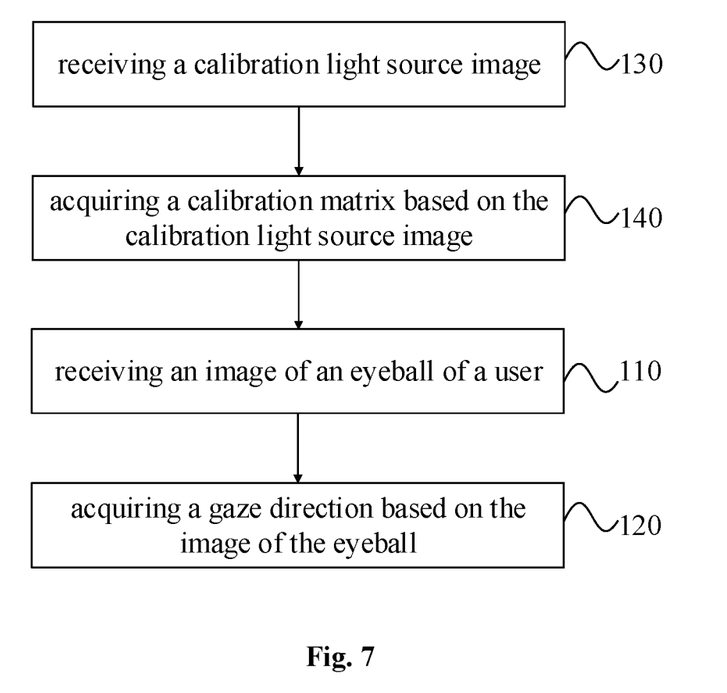
FIG. 7 is a flow chart of an eye tracking method applied to video glasses according to some embodiments of the present disclosure.

In some embodiments of the present disclosure, as shown in FIG. 7, before step 110, the eye tracking method further includes steps 130 to 140.

The step 130 includes receiving a calibration light source image.

Specifically, the calibration light source image is acquired by the main control component from the image sensor component.

The step 140 includes acquiring a calibration matrix based on the calibration light source image.

In the embodiments of the present disclosure, the calibration matrix is acquired base on the calibration light source image of the calibration light source component. Specifically, the main control component performs image processing based on an adequate amount of images of the calibration light sources to acquire a position of each calibration light source in the image, and performs camera setting using a camera calibration method (such as Zhengyou Zhang calibration method) to acquire the calibration matrix corresponding to the image sensor component.

In some embodiments of the present disclosure, the step 120 includes acquiring the gaze direction based on the image of the eyeball and the calibration matrix.

Specifically, the step 120 may include acquiring calibrated image of the eyeball according to a product of the image of the eyeball and the calibration matrix so as to obtain the gaze direction based on the calibrated image of the eyeball.

Based on the inventive concept of the foregoing embodiments, the present disclosure further provides a pair of video glasses in some embodiments. The video glasses include an eye tracking device applied to video glasses.

In some embodiments of the present disclosure, the pair of video glasses includes a pair of virtual reality glasses or a pair of augmented reality glasses.

The eye tracking device in the embodiments is the eye tracking device provided in the foregoing embodiments, implementing principles and achieved effects of which are similar and therefore not repeated herein.

The drawings in the embodiments of the present disclosure only relate to related structures in the embodiments of the present disclosure, while other structures may refer to common design.

The embodiments of the disclosure or features in the embodiments can be combined to obtain new embodiments as long as no conflict is caused.

Although implementations of the present disclosure are disclosed hereinabove, the described contents are merely to facilitate understanding the embodiments of the present disclosure rather than to limit the embodiments of the present disclosure. Those skilled in the art can make modifications and changes in implementing forms and details without departing from the principle and scope disclosed in the embodiments of the present disclosure. The protection scope of the present disclosure conforms with the scope defined by the appended claims.

What is claimed is:

1. An eye tracking device applied to a pair of video glasses, comprising a light source component, a reflection component, an image sensor component and a main control component;

wherein the light source component is configured to emit invisible light to an eyeball;

wherein the reflection component is configured to reflect the invisible light reflected by the eyeball;

wherein the image sensor component is configured to generate an image of the eyeball based on the invisible light reflected by the reflection component;

wherein the main control component is coupled to the image sensor component and is configured to acquire a gaze direction based on the image of the eyeball;

wherein the eye tracking device further comprises a calibration light source component, wherein the calibration light source component is configured to emit invisible light to the reflection component;

wherein the reflection component is configured to reflect the invisible light emitted by the calibration light source, the image sensor component is configured to generate a calibration light source image, and the main control component is configured to acquire a calibration matrix corresponding to the image sensor component based on the calibration light source image;

wherein the main control component is configured to acquire the gaze direction based on the image of the eyeball and the calibration matrix.

2. The eye tracking device according to claim 1, wherein the light source component comprises one or more light sources for emitting invisible light.

3. The eye tracking device according to claim 2, wherein the one or more light sources comprise an infrared light source or an ultraviolet light source.

4. The eye tracking device according to claim 1, wherein the video glasses comprise a lens, and the reflection component is arranged at a side of the lens close to the image sensor component.

5. The eye tracking device according to claim 4, wherein the reflection component comprises an invisible light reflective film, and the invisible light reflective film is coated on a surface of the lens at the side close to the image sensor component.

6. The eye tracking device according to claim 4, wherein the light source component comprises a plurality of light sources for emitting invisible light, and the plurality of light sources is uniformly distributed along a circumferential direction of the lens.

7. The eye tracking device according to claim 1, wherein the light source component is configured to emit light having a predetermined wavelength;

the reflection component is configured to reflect the light having the predetermined wavelength; and the image sensor component is configured to generate the image of the eyeball based on the light having the predetermined wavelength.

8. The eye tracking device according to claim 7, wherein the predetermined wavelength is 850 nm.

9. The eye tracking device according to claim 1, wherein the calibration light source component comprises calibration light sources arranged in an array.

10. The eye tracking device according to claim 1, wherein the light source component is connected to the main control component via a first interface, the first interface being a one-way interface through which a control signal is transmitted from the main control component to the light source component, and/or the first interface being an interface having a power supplying function;

wherein the image sensor component is connected to the main control component via a second interface, the second interface being a two-way interface through which at least one of a control signal or a digital signal is transmitted between the main control component and the image sensor component, and/or the second interface being an interface having a power supplying function; and wherein the calibration light source component is connected to the main control component via a third interface, the third interface being a one-way interface through which a control signal is transmitted from the main control component to the calibration light source component, and/or the third interface being an interface having a power supplying function.

11. The eye tracking device according to claim 1, wherein the main control component is configured to determine a position of a gaze point of the eyeball corresponding to the gaze direction according to a predetermined correspondence between gaze directions and positions of gaze points of the eyeball.

12. A pair of video glasses, comprising an eye tracking device, wherein the eye tracking device comprises a light source component, a reflection component, an image sensor component and a main control component;

wherein the light source component is configured to emit invisible light to an eyeball;

wherein the reflection component is configured to reflect the invisible light reflected by the eyeball;

wherein the image sensor component is configured to generate an image of the eyeball based on the invisible light reflected by the reflection component;

wherein the main control component is coupled to the image sensor component and is configured to acquire a gaze direction based on the image of the eyeball;

wherein the eye tracking device further comprises a calibration light source component, wherein the calibration light source component is configured to emit invisible light to the reflection component;

wherein the reflection component is configured to reflect the invisible light emitted by the calibration light source, the image sensor component is configured to generate a calibration light source image, and the main control component is configured to acquire a calibration matrix corresponding to the image sensor component based on the calibration light source image;

wherein the main control component is configured to acquire the gaze direction based on the image of the eyeball and the calibration matrix.

13. The pair of video glasses according to claim 12, further comprising a lens, wherein the reflection component comprises an invisible light reflective film, and the invisible light reflective film is coated on a surface of the lens at a side of the lens close to the image sensor component.

14. The pair of video glasses according to claim 13, wherein the light source component comprises a plurality of light sources for emitting invisible light, and the plurality of light sources is uniformly distributed along a circumferential direction of the lens.

15. An eye tracking method applied to a pair of video glasses and implemented with an eye tracking device, wherein the eye tracking device comprises a light source component, a reflection component, an image sensor component and a main control component;

wherein the light source component is configured to emit invisible light to an eyeball, the reflection component is configured to reflect the invisible light reflected by the eyeball, the image sensor component is configured to generate an image of the eyeball based on the invisible light reflected by the reflection component, and the main control component is coupled to the image sensor component and is configured to acquire a gaze direction based on the image of the eyeball;

wherein the eye tracking device further comprises a calibration light source component, wherein the calibration light source component is configured to emit invisible light to the reflection component; wherein the reflection component is configured to reflect the invisible light emitted by the calibration light source, the image sensor component is configured to generate a calibration light source image, and the main control component is configured to acquire a calibration matrix corresponding to the image sensor component based on the calibration light source image; wherein the main control component is configured to acquire the gaze direction based on the image of the eyeball and the calibration matrix;

wherein the eye tracking method comprises:

receiving an image of an eyeball; and acquiring a gaze direction based on the image of the eyeball.

16. The eye tracking method according to claim 15, wherein before receiving the image of the eyeball, the eye tracking method further comprises:

receiving a calibration light source image; and acquiring a calibration matrix based on the calibration light source image.

17. The eye tracking method according to claim 16, wherein acquiring the gaze direction based on the image of the eyeball comprises: acquiring the gaze direction based on the image of the eyeball and the calibration matrix.

* * * * *